United States Patent
Uan-Zo-li et al.

(10) Patent No.: US 10,199,842 B2
(45) Date of Patent: Feb. 5, 2019

(54) POWER SUPPLY CONTROL SYSTEM

(71) Applicant: Intel Corporation, Santa Clara, CA (US)

(72) Inventors: Alexander B. Uan-Zo-li, Hillsboro, OR (US); Xiaoguo Liang, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 25 days.

(21) Appl. No.: 15/085,886

(22) Filed: Mar. 30, 2016

(65) Prior Publication Data
US 2017/0288430 A1  Oct. 5, 2017

(51) Int. Cl.
H02J 7/00 (2006.01)

(52) U.S. Cl.
CPC .......... H02J 7/0029 (2013.01); H02J 7/0068 (2013.01); H02J 7/0077 (2013.01)

(58) Field of Classification Search
CPC .................................................... H02J 7/0029
USPC ............................................................. 320/107
See application file for complete search history.

(56) References Cited

U.S. PATENT DOCUMENTS

| | | | | |
|---|---|---|---|---|
| 5,422,559 A | * | 6/1995 | Hall | H02J 7/008 320/139 |
| 7,560,902 B2 | | 7/2009 | Unger | |
| 2006/0187689 A1 | | 8/2006 | Hartular | |
| 2008/0191557 A1 | | 8/2008 | Maireanu | |
| 2009/0058393 A1 | | 3/2009 | Huang | |
| 2011/0133700 A1 | * | 6/2011 | Martin | H02J 7/0068 320/145 |
| 2012/0139500 A1 | | 6/2012 | Ye et al. | |
| 2013/0043877 A1 | | 2/2013 | Tang | |
| 2013/0221905 A1 | * | 8/2013 | Holloway | H02J 7/0054 320/107 |
| 2014/0320068 A1 | | 10/2014 | Toshiba | |
| 2015/0077040 A1 | * | 3/2015 | Longdon | H02J 7/0052 320/107 |
| 2017/0187199 A1 | * | 6/2017 | Wei | H02J 7/007 |
| 2017/0222463 A1 | * | 8/2017 | Pullen | H02J 7/0072 |

FOREIGN PATENT DOCUMENTS

KR   1020070023460   2/2007

OTHER PUBLICATIONS

PCT Application No. PCT/US2017/016532, International Search Report and the Written Opinion, dated May 23, 2017, 15 pgs.
Dearborn, Scott, et al., "Charging Li-ion Batteries for Maximum Run Times," Power Electronics Technology, pp. 40-49, Apr. 2005.
International Preliminary Report on Patentability received for PCT Patent Application No. PCT/US2017/016532, dated Oct. 11, 2018, 12 pages.

* cited by examiner

*Primary Examiner* — Suchin Parihar
(74) *Attorney, Agent, or Firm* — Womble Bond Dickinson (US) LLP

(57) ABSTRACT

A method and apparatus for controlling the power supply for a system. In one embodiment, a power supply apparatus comprises a rechargeable battery; and a battery charger coupled to the battery and comprising a first circuit to generate an output that controls whether the battery is to provide power to the system to supplement the power provided by the power source when an input voltage from the power source of undetermined output power is less than a predetermined level.

16 Claims, 5 Drawing Sheets

POWER SUPPLY CONTROL SYSTEM

FIELD OF THE INVENTION

Embodiments of the present invention relate to the field of power supply control systems; more particularly, embodiments of the present invention relate to battery chargers that control a power supply system that provides power to a system load when the power source provides an undetermined output power to a system load.

BACKGROUND OF THE INVENTION

Today, the mobile industry is moving towards using the power sources with potentially unreliable or fluctuating and time dependent power capabilities. These sources include wireless power, solar power, as well as Universal Serial Bus (USB) Power Delivery (PD) power supplies. Also, there is continued drive for higher relative turbo power by System-on-a-Chips (SoCs) and other integrated circuits used in computing systems. Even while this occurs, there are still demands for smaller adapter sizes.

More specifically, with respect to wireless energy, one of the issues that worries power delivery engineers is the fact that the amount of power transmitted from the power source to the charger of the mobile device varies dependent on the distance from the power source and the receiver, the device orientation and the like. With respect to solar panels, the energy that can be captured and converted to electrical energy is strongly dependent on the time of day, strength of solar radiation and the like. Thus, in both these cases, it may be unknown to a computing system being powered by such energy sources as to the amount of power that they may receive.

Some customers may also experience issues with USB adapters when the actual output power of the power adapter may not be necessarily known beforehand, or when a universal USB adapter is made by a second-tier supplier and may be designed for lower temperature or may even have less than required output power capability.

For all of the cases discussed above, the system being powered (i.e., the system load) will in some cases require too much power from the power source to support system operation and/or charge the battery, and a number of corner cases arise when the system does not know the actual maximum output power capability of the source. This include the situation of when the power adapter is designed for limited periods of peak power, but cannot handle longer duration high load. A real life situation would be for the power source to be periodically shut off because its power capability is exceeded, and the system may cut off a battery charger in the power system from the input power. The result of this corner case could be damage to the system circuitry or the power source, audio noise irritating to the end-users, as well as the system drawing less power from the power source than possible.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Figure 1:
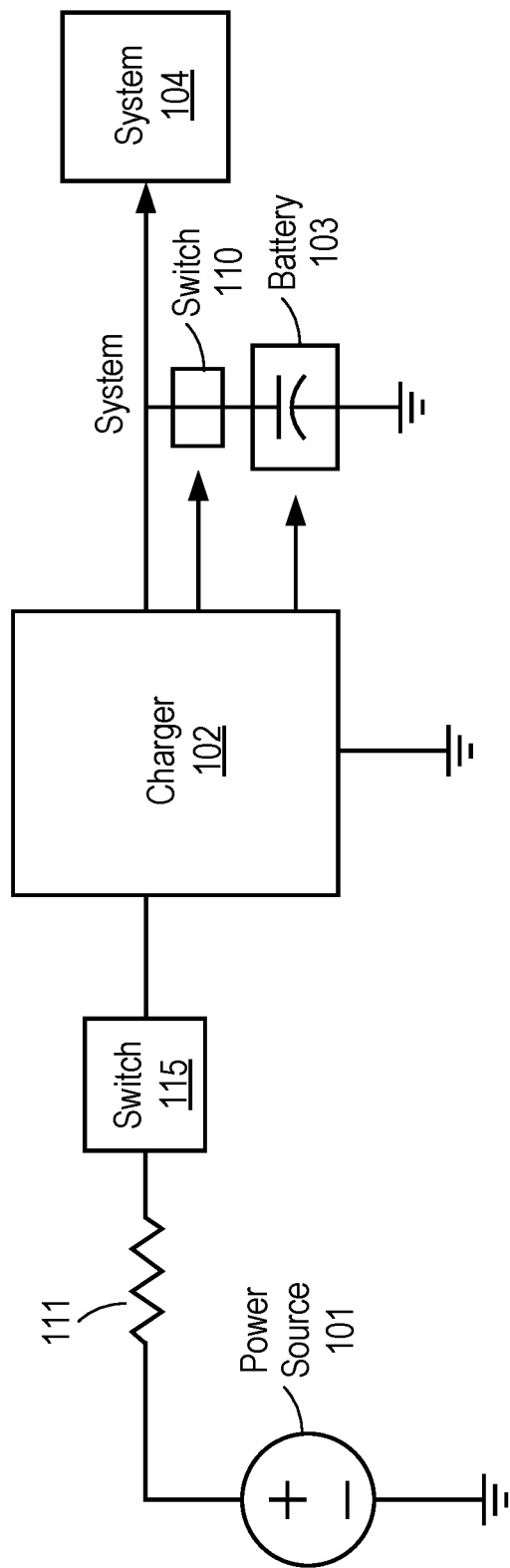
FIG. 1 is a block diagram of a mobile computing system connected to a power source with limited power capability.

FIG. 1 is a block diagram of a power supply system providing power to a system load. Referring to FIG. 1, a power source 101 provides power through a resistance to a charger 102 to a system load 104. In one embodiment, the system load is a mobile computing system, such as a smartphone, tablet, laptop computer. Such systems often have a processor and a memory that are powered by power from power source 101 and rechargeable battery 103. In one embodiment, rechargeable battery 103 is a lithium-ion battery pack. Note that the embodiments described herein are not limited to use of a lithium-ion battery pack and other rechargeable batteries may be used. The actual system may also have elements of system 104 or all of it connected directly to the output of power source 101.

Power source 101 comprises a power source of undetermined output power. In one embodiment, power source 101 is a wireless power source. In another embodiment, power source 101 is a solar power source. In another embodiment, power source 101 is a Universal Serial Bus (USB) Power Delivery (PD) power supply. Power source 101 provides a voltage that may change due to changes in conditions (for example, the user may change the position of the wireless power, the cloud may change the amount of power that the solar panel captures, etc.), or its power capability may vary due to the same factors.

In one embodiment, charger 102 comprises a narrow voltage direct current (NVDC)-type charger. In some situations, a charger will not know that power source 101 has less available power (which means that the voltage source is lower voltage or higher resistance). In this case, if the system/battery power consumption exceeds the capability of power source 101, a traditional charger will attempt to draw full power from power source 101, and this will result in power source 101 shutting down or charger 102 turning off switch 115 (e.g., pass field effect transistors (FETs) because the input voltage to charger 102 is too low. Note in one embodiment an electronic lossless resistor, such as resistor 111, i.e. the load line, may be used in order to protect power source 101 from over-current. In one embodiment, the power source uses a current protection/current limiting in order to prevent over-current.

Figure 2:
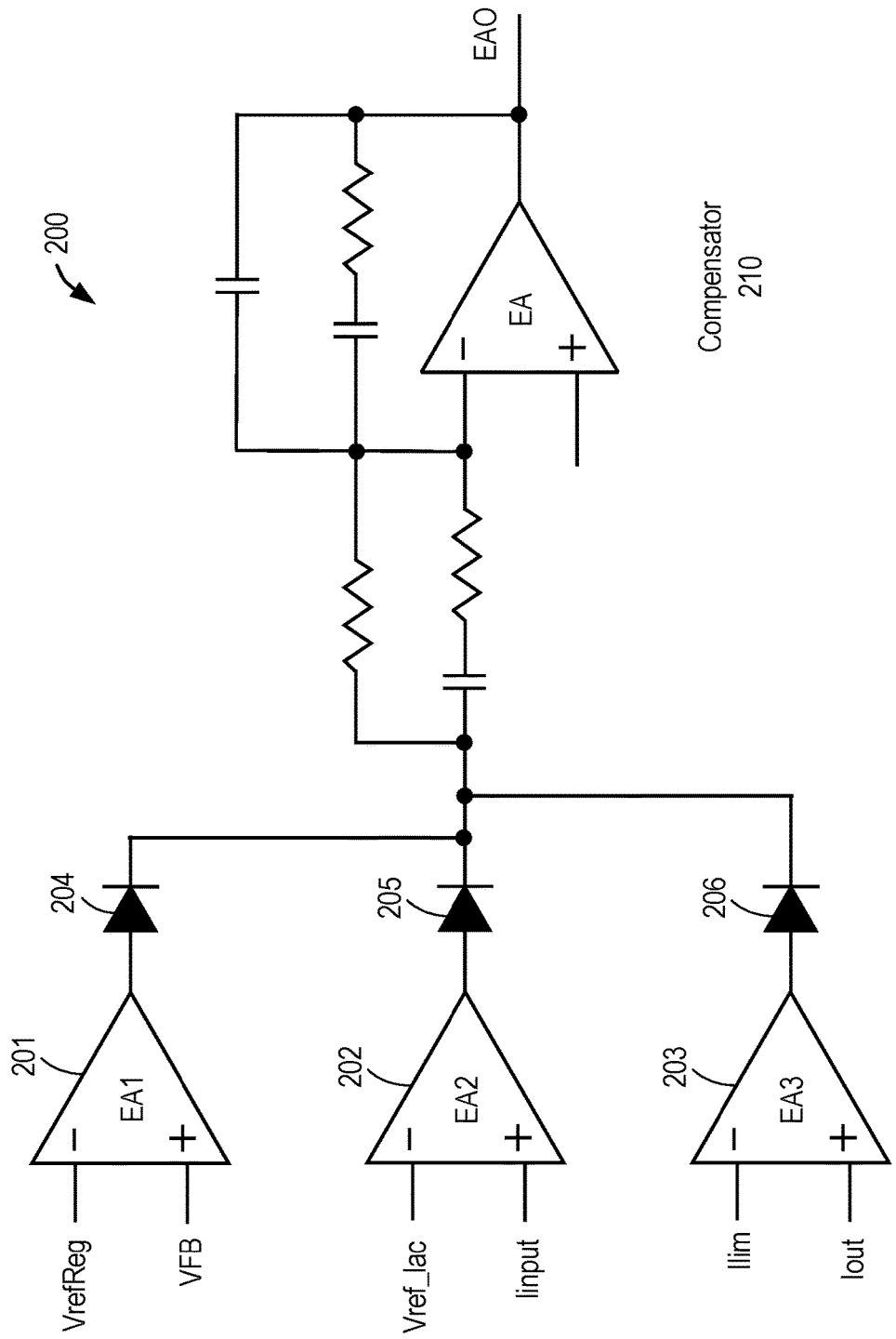
FIG. 2 illustrates a simplified schematic for a charger controller for a charger integrated circuit (IC).

FIG. 2 shows a simplified part of a schematic for a typical charger controller for a charger such as could be used as charger 102 of FIG. 1. Referring to FIG. 2, charger 200 includes three operational amplifiers 201-203, each with two inputs and an output. The output of operational amplifiers 201 is coupled to the input of diode 204. The output of operational amplifiers 202 is coupled to the input of diode 205. The output of operational amplifiers 203 is coupled to the input of diode 206. The outputs of diodes 204-206 are coupled to compensator 210 that combines the outputs of diodes 204-206, which represents the outputs of operational amplifiers 201-203, into output EOA.

The charger duty cycle is controlled based on three system variables: battery voltage (EA1), input current (EA2) and the charger/battery current (EA3). If any of the variables exceed a reference level (VrefReg for battery voltage, Vref_Iac for input current and Ilim for battery current), the duty cycle will be throttled and the charger will consume less power from the power source. VrefReg represents the predetermined upper voltage limit below which the battery is held when charging to avoid damaging the battery. Operational amplifier 201 compares the battery voltage to the reference value VrefReg and if the battery voltage exceeds VrefReg, the battery charger prevents the battery from being charged by power from the power source. Vref_Iac represents an upper current limit below which operation of the power source is held to avoid crashing the system. Operational amplifier 202 compares the input current from the power source to the reference value Vref_Iac and if the input current exceeds Vref_Iac, the battery charger prevents the input current from the power source from reaching the system to avoid crashing the system by cutting the charge current to the battery or the charger output current. Ilim represents an upper battery current limit below which the current used when charging the battery is held to avoid damaging the battery. Operational amplifier 203 compares the battery charge current or the charger output current to the reference value Ilim for the battery current and if the battery current exceeds Ilim, the battery charger prevents the battery charger from charging the battery with power from the power source.

In one embodiment, all the limits, including the battery current and voltage as well as the power source maximum output, are preset in the system.

Figure 3:
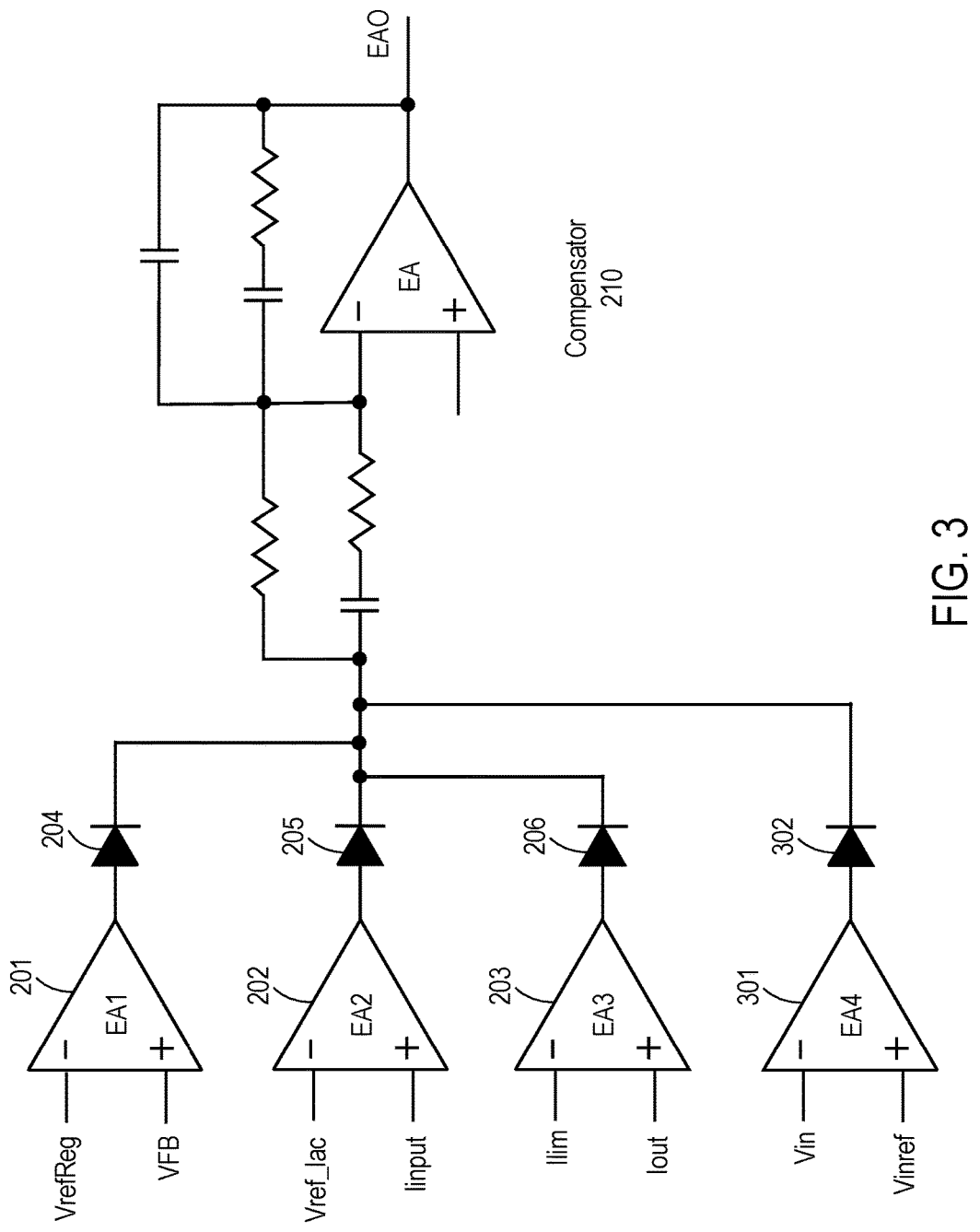
FIG. 3 illustrates one embodiment of a control system for a charger IC.

In one embodiment, an additional comparison is added to the control system which allows the system load to efficiently operate from a power source of undetermined output power capability or when the output capability of the power source is less than expected. FIG. 3 shows one possible embodiment and illustrates simplified control diagram for such a charger with an added control loop to accommodate the case when the power source output power may be not known.

Referring to FIG. 3, one additional amplifier, operational amplifier 301 is added to the circuit, along with a corresponding diode 302. In order to prevent the power source to be over-powered by the charger (or system current in case of traditional or Hybrid Power Boost chargers), the charger uses an extra control loop for the input voltage. If the input voltage droops below a pre-determined level, referred to herein as reference value VinRef (this situation will occur if the power drawn from the power source is too high), the charger goes into a duty-cycle limiting mode, and lowers down the output of the charger and lowers the input power of the charger (i.e., lowers the power taken for the power source). The charger may also use the battery to supplement the power source. This results in the stabilization of the output voltage of the variable power source at the minimum level, thereby preventing it from shutting down. The additional loop will effectively over-power all other loops, and the charger will operate at a DC/DC converter, and will draw just enough power to keep the power source output voltage as a pre-determined voltage level. Note that input voltage is already monitored by the charger, so there is very little additional cost to employ such an addition. Thus, the battery charger has a new variable "minimum input voltage" that is used to control the charger duty cycle and output and input power of the charger, such that when the input voltage droops below this level, the charger limits the duty cycle.

In one embodiment, the battery charger includes a circuit to generate, when the power source voltage of undetermined output power is less than a predetermined level (e.g., a system minimum reference level), an output that controls whether the battery is to provide power to the system to supplement the power provided by the power source or the charger is to lower the charging current of the battery until the input voltage is returned to the predetermined level.

A similar protection can be used on the Hybrid Power Boost (HPB) and traditional chargers, with very few changes. For some systems where the load is connected directly to the power source, if the power source voltage droops to the minimum value, the charger may supplement the power from the power source by delivering the power from the battery to the system (i.e. operating in the opposite direction). By supplementing the power source output power to the system, the charger will maintain the power source output voltage at a predetermined level.

If the voltage continues to droop below the pre-set limit, the charger will detect that the power source is removed, and the pass FETs will be turned off. In the case of traditional or HPB chargers, the charger will stop supplementing the input power source if it is determined that the power source is not delivering any power (or below some threshold), or if the delivered power from the source is below the losses in the charger operating the reverse mode.

If the power source re-acquires higher output power capability, then its output voltage will naturally go up (the power source will provide more power than is taken from it by the load), and the charger input voltage loop will automatically come out of regulation and another loop (battery current or voltage) will control the charger operation. In one embodiment, the minimum voltage level of the adapter for this regulation is pre-set by the customers, and is same for the charger and the adapter. The level can also be negotiated between the USB charger and the adapter through the USB PD and be flexible if needed.

Figure 4:
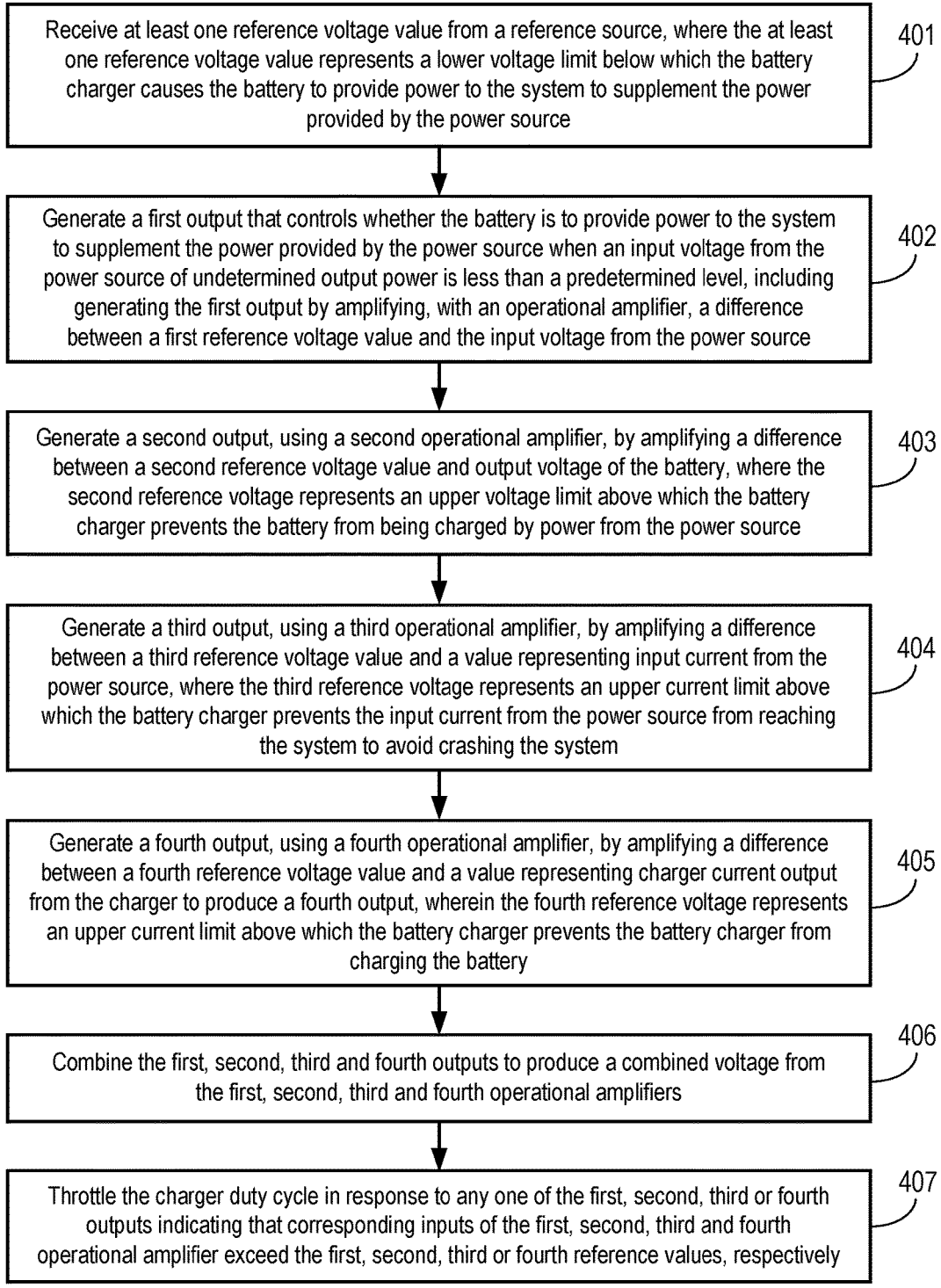
FIG. 4 is a flow diagram of one embodiment of a process for controlling a power supply system.

FIG. 4 is a flow diagram of one embodiment of a process for controlling a power supply system. The power supply system includes a rechargeable battery, a system load, and a power source of undetermined output power that provides power to the system load. In one embodiment, the process is performed by processing logic that may comprise hardware (circuitry, dedicated logic, etc.), software (such as is run on a general purpose computer system or a dedicated machine), firmware, or a combination of the three.

The process begins by processing logic receiving at least one reference voltage value from a reference source, where the at least one reference voltage value represents a lower voltage limit below which the battery charger causes the battery to provide power to the system to supplement the power provided by the power source (processing block 401).

Next, processing logic generates a first output that controls whether the battery is to provide power to the system to supplement the power provided by the power source when an input voltage from the power source of undetermined output power is less than a predetermined level, including generating the first output by amplifying, with an operational amplifier, a difference between a first reference voltage value and the input voltage from the power source (processing block 402).

Also, processing logic generates a second output, using a second operational amplifier, by amplifying a difference between a second reference voltage value and output voltage of the battery, where the second reference voltage represents an upper voltage limit above which the battery charger prevents the battery from being charged by power from the power source (processing block 403).

Similarly, processing logic generates a third output, using a third operational amplifier, by amplifying a difference between a third reference voltage value and a value representing input current from the power source, where the third reference voltage represents an upper current limit above which the battery charger prevents the input current from the power source from reaching the system to avoid crashing the system (processing block 404).

Likewise, processing logic generates a fourth output, using a fourth operational amplifier, by amplifying a difference between a fourth reference voltage value and a value representing charger current output from the charger to produce a fourth output, wherein the fourth reference voltage represents an upper current limit above which the battery charger prevents the battery charger from charging the battery (processing block 405).

Thereafter, processing logic combines the first, second, third and fourth outputs to produce a combined voltage from the first, second, third and fourth operational amplifiers (processing block 406). In one embodiment, combining the first, second, third and fourth outputs to produce the combined control voltage is performed, at least in part, by the compensator that determines the charger duty cycle based on the first, second, third, and fourth outputs into the combined voltage. Determining the charger duty cycle using a compensator is performed in a manner well-known in the art.

In response to the combined voltage, processing logic controls the charger duty cycle in response to any one of the first, second, third or fourth outputs indicating that corresponding inputs of the first, second, third and fourth operational amplifier exceed the first, second, third or fourth reference values, respectively (processing block 407).

Figure 5:
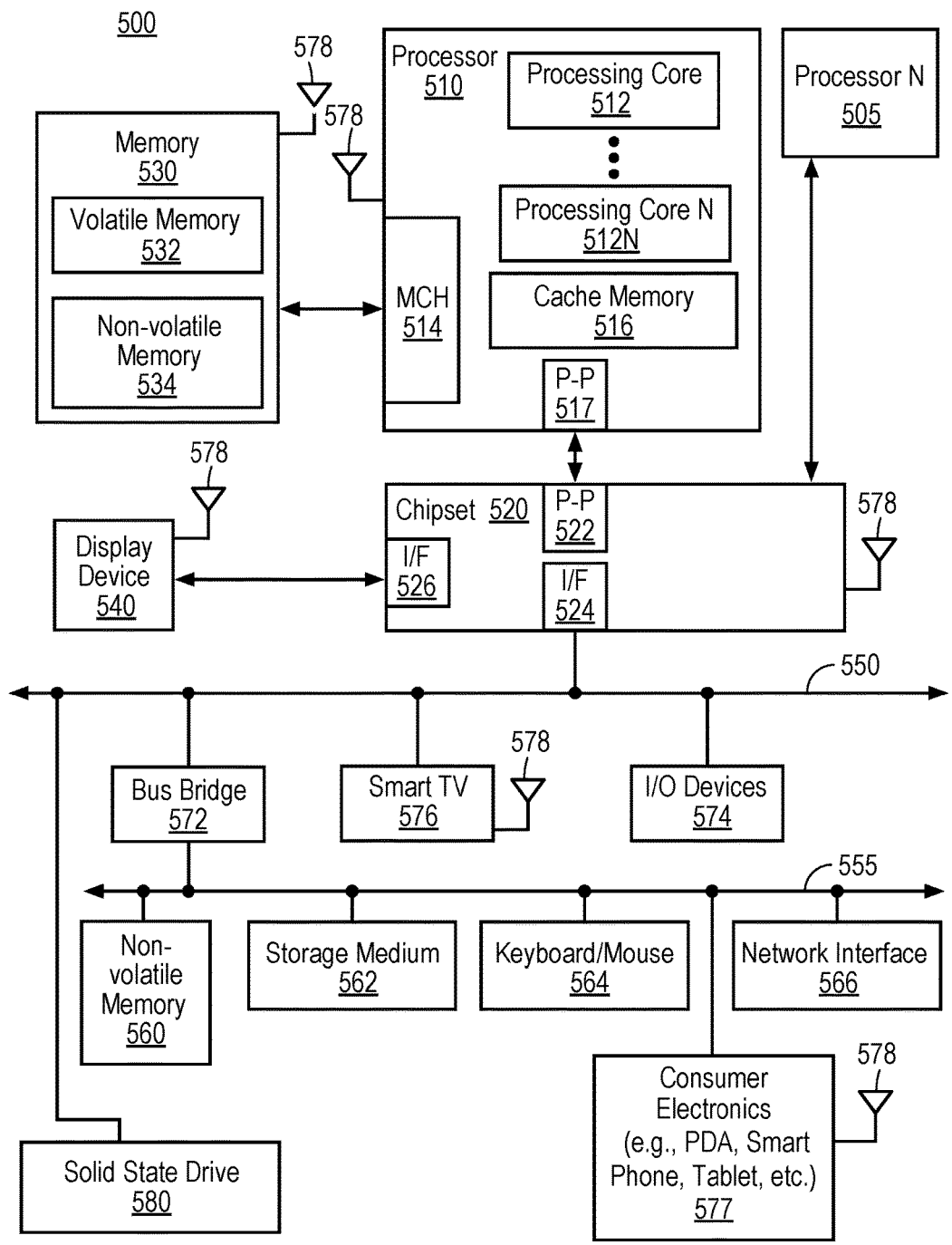
FIG. 5 depicts a block diagram of a system load.

FIG. 5 is one embodiment of a system level diagram 500 that may incorporate the techniques described above. For example, the techniques described above may be used in conjunction with a processor in system 500 or other part of system 500.

Referring to FIG. 5, system 500 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In another embodiment, system 500 implements the methods disclosed herein and may be a system on a chip (SOC) system.

In one embodiment, processor 510 has one or more processor cores 512 to 512N, where 512N represents the Nth processor core inside the processor 510 where N is a positive integer. In one embodiment, system 500 includes multiple processors including processors 510 and 505, where processor 505 has logic similar or identical to logic of processor 510. In one embodiment, system 500 includes multiple processors including processors 510 and 505 such that processor 505 has logic that is completely independent from the logic of processor 510. In such an embodiment, a multi-package system 500 is a heterogeneous multi-package system because the processors 505 and 510 have different logic units. In one embodiment, processing core 512 includes, but is not limited to, pre-fetch logic to fetch instructions, decode logic to decode the instructions, execution logic to execute instructions and the like. In one embodiment, processor 510 has a cache memory 516 to cache instructions and/or data of the system 500. In another embodiment of the invention, cache memory 516 includes level one, level two and level three, cache memory, or any other configuration of the cache memory within processor 510.

In one embodiment, processor 510 includes a memory control hub (MCH) 514, which is operable to perform functions that enable processor 510 to access and communicate with a memory 530 that includes a volatile memory 532 and/or a non-volatile memory 534. In one embodiment, memory control hub (MCH) 514 is positioned outside of processor 510 as an independent integrated circuit.

In one embodiment, processor 510 is operable to communicate with memory 530 and a chipset 520. In such an embodiment, SSD 580 executes the computer-executable instructions when SSD 580 is powered up.

In one embodiment, processor 510 is also coupled to a wireless antenna 578 to communicate with any device configured to transmit and/or receive wireless signals. In one embodiment, wireless antenna interface 578 operates in accordance with, but is not limited to, the IEEE 802.11 standard and its related family, HomePlug AV (HPAV), Ultra Wide Band (UWB), Bluetooth, WiMAX, or any form of wireless communication protocol.

In one embodiment, the volatile memory 532 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 534 includes, but is not limited to, flash memory (e.g., NAND, NOR), phase change memory (PCM), read-only memory (ROM), electrically erasable programmable read-only memory (EEPROM), or any other type of non-volatile memory device.

Memory 530 stores information and instructions to be executed by processor 510. In one embodiment, chipset 520 connects with processor 510 via Point-to-Point (PtP or P-P) interfaces 517 and 522. In one embodiment, chipset 520 enables processor 510 to connect to other modules in the system 500. In one embodiment, interfaces 517 and 522 operate in accordance with a PtP communication protocol such as the Intel QuickPath Interconnect (QPI) or the like.

In one embodiment, chip set 520 is operable to communicate with processor 510, 505, display device 540, and other devices 572, 576, 574, 560, 562, 564, 566, 577, etc. In one embodiment, chipset 520 is also coupled to a wireless antenna 578 to communicate with any device configured to transmit and/or receive wireless signals.

In one embodiment, chip set 520 connects to a display device 540 via an interface 526. In one embodiment, display device 540 includes, but is not limited to, liquid crystal display (LCD), plasma, cathode ray tube (CRT) display, or any other form of visual display device. In addition, chipset 520 connects to one or more buses 550 and 555 that interconnect various modules 574, 560, 562, 564, and 566. In one embodiment, buses 550 and 555 may be interconnected together via a bus bridge 572 if there is a mismatch in bus speed or communication protocol. In one embodiment, chipset 520 couples with, but is not limited to, a non-volatile memory 560, a mass storage device(s) 562, a keyboard/mouse 564, and a network interface 566 via interface 524, smart TV 576, consumer electronics 577, etc.

In one embodiment, mass storage device 562 includes, but is not limited to, a solid state drive, a hard disk drive, a universal serial bus flash memory drive, or any other form of computer data storage medium. In one embodiment, network interface 566 is implemented by any type of well-known network interface standard including, but not limited to, an Ethernet interface, a universal serial bus (USB) interface, a Peripheral Component Interconnect (PCI) Express interface, a wireless interface and/or any other suitable type of interface.

While the modules shown in FIG. 5 are depicted as separate blocks within the system 500, the functions performed by some of these blocks may be integrated within a single semiconductor circuit or may be implemented using two or more separate integrated circuits.

In a first example embodiment, a power supply apparatus for use with a power source of undetermined output power that provides power to a system load comprises a rechargeable battery and a battery charger coupled to provide a charging current to the battery, where the battery charger comprises a first circuit to generate, when the power source voltage of the undetermined output power is less than a predetermined level, an output that controls whether the battery is to provide power to the system to supplement the power provided by the power source or the charger is to lower the charging current of the battery unit until the power source voltage returns to the predetermined level.

In another example embodiment, the subject matter of the first example embodiment can optionally include that the first circuit comprises a first operational amplifier to amplify a difference between a first reference voltage value and the input voltage from the power source to produce a first output, wherein the first reference voltage represents a lower voltage limit below which the battery charger causes the battery to provide power to the system to supplement the power provided by the power source.

In another example embodiment, the subject matter of the first example embodiment can optionally include that the battery charger further comprises: a second operational amplifier to amplify a difference between a second reference voltage value and output voltage of the battery to produce a second output, wherein the second reference voltage represents an upper voltage limit above which the battery charger prevents the battery from being charged by power from the power source; a third operational amplifier to amplify a difference between a third reference voltage value and a value representing input current from the power source to produce a third output, wherein the third reference voltage represents an upper current limit below which the battery charger holds the input current from the power source to prevent the input current from the power source from crashing the system; and a fourth operational amplify a difference between a fourth reference voltage value and a value representing charger current output from the charger to produce a fourth output, wherein the fourth reference voltage represents an upper current limit above which the battery charger prevents the charging of the battery. In another example embodiment, the subject matter of this example embodiment can optionally include a second circuit coupled to the first, second, third and fourth operational amplifiers to combine the first, second, third and fourth outputs to produce a combined voltage. In another example embodiment, the subject matter of this example embodiment can optionally include that the second circuit comprises a compensator to integrate the first, second, third, and fourth outputs into the combined voltage.

In another example embodiment, the subject matter of the first example embodiment can optionally include that the battery charger is operable to control (e.g., throttle, limit, etc.) the charger duty cycle in response to any one of the first, second, third or fourth outputs indicating that corresponding inputs of the first, second, third and fourth operational amplifier exceed the first, second, third or fourth reference values, respectively.

In another example embodiment, the subject matter of the first example embodiment can optionally include a diode connected to each of the first, second, third and fourth outputs.

In another example embodiment, the subject matter of the first example embodiment can optionally include a diode connected to the first output.

In a second example embodiment, a battery charger for coupling to a rechargeable battery, a system load, and a power source of undetermined output power that provides power to the system load comprises a first circuit to generate an output that controls whether the battery is to provide power to the system to supplement the power provided by the power source when an input voltage from the power source of undetermined output power is less than a predetermined level, wherein the first circuit comprises a first operational amplifier to amplify a difference between a first reference voltage value and the input voltage from the power source to produce a first output, wherein the first reference voltage represents a lower voltage limit below which the battery charger causes the battery to provide power to the system to supplement the power provided by the power source.

In another example embodiment, the subject matter of the second example embodiment can optionally include that the battery charger further comprises: a second operational amplifier to amplify a difference between a second reference voltage value and output voltage of the battery to produce a second output, wherein the second reference voltage represents an upper voltage limit above which the battery charger prevents the battery from being charged by power from the power source; a third operational amplifier to amplify a difference between a third reference voltage value and a value representing input current from the power source to produce a third output, wherein the third reference voltage represents an upper current limit below which the battery charger holds the input current from the power source to prevent the input current from the power source from crashing the system; and a fourth operational amplify a difference between a fourth reference voltage value and a value representing charger current output from the charger to produce a fourth output, wherein the fourth reference voltage represents an upper current limit above which the battery charger prevents the charging of the battery.

In another example embodiment, the subject matter of the second example embodiment can optionally include a second circuit to combine the first, second, third and fourth outputs to produce a combined voltage from the first, second, third and fourth operational amplifiers. In another example embodiment, the subject matter of this example embodiment can optionally include that the second circuit comprises a compensator to integrate the first, second, third, and fourth outputs into the combined voltage.

In another example embodiment, the subject matter of the second example embodiment can optionally include that the battery charger is operable to control (e.g., limit, throttle, etc.) the charger duty cycle in response to any one of the first, second, third or fourth outputs indicating that corresponding inputs of the first, second, third and fourth operational amplifier exceed the first, second, third or fourth reference values, respectively.

In another example embodiment, the subject matter of the second example embodiment can optionally include a diode connected to each of the first, second, third and fourth outputs.

In another example embodiment, the subject matter of the second example embodiment can optionally include a diode connected to the first output.

In a third example embodiment, a method for controlling a battery charger that is coupled to a rechargeable battery, a system load, and a power source of undetermined output power that provides power to the system load, comprises: receiving at least one reference voltage value from a reference source, the at least one reference voltage value representing a lower voltage limit below which the battery charger causes the battery to provide power to the system to supplement the power provided by the power source or the charger to lower the charging current of the battery until the power source voltage is returned to a predetermined level; and generating a first output that controls whether the battery is to provide power to the system to supplement the power provided by the power source when the power source voltage from the power source of undetermined output power is less than the predetermined level, including generating the first output by amplifying, with an operational amplifier, a difference between a first reference voltage value and the input voltage from the power source.

In another example embodiment, the subject matter of the third example embodiment can optionally include that the method further comprises: generating a second output, using a second operational amplifier, by amplifying a difference between a second reference voltage value and output voltage of the battery, wherein the second reference voltage represents an upper voltage limit above which the battery charger prevents the battery from being charged by power from the power source; generating a third output, using a third operational amplifier, by amplifying a difference between a third reference voltage value and a value representing input current from the power source, wherein the third reference voltage represents an upper current limit below which the battery charger holds the input current from the power source to prevent the input current from the power source from crashing the system; and generating a fourth output, using a fourth operational amplifier, by amplifying a difference between a fourth reference voltage value and a value representing charger current output from the charger to produce a fourth output, wherein the fourth reference voltage represents an upper current limit above which the battery charger prevents the charging of the battery. In another example embodiment, the subject matter of this example embodiment can optionally include combining the first, second, third and fourth outputs to produce a combined voltage from the first, second, third and fourth operational amplifiers. In another example embodiment, the subject matter of this example embodiment can optionally include combining the first, second, third and fourth outputs to produce the combined voltage is performed, at least in part, by a compensator that integrates the first, second, third, and fourth outputs into the combined voltage.

In another example embodiment, the subject matter of the third example embodiment can optionally include that the battery charger is operable to throttle the charger duty cycle in response to any one of the first, second, third or fourth outputs indicating that corresponding inputs of the first, second, third and fourth operational amplifier exceed the first, second, third or fourth reference values, respectively.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A power supply apparatus for use with a power source of undetermined output power that provides power to a system load, the power supply apparatus comprising:
   a rechargeable battery; and
   a battery charger coupled to provide a charging current to the battery and comprising
      a first circuit to generate, when the power source voltage of the undetermined output power is less than a predetermined level, an output that controls whether the battery is to provide power to the system to supplement the power provided by the power source or the charger enters a duty-cycling limiting mode to lower the charging current of the battery and lower input power of the charger until the input voltage returns to the predetermined level, wherein the first circuit comprises a first operational amplifier to amplify a difference between a first reference voltage value and the input voltage from the power source to produce a first output, wherein the first reference voltage represents a lower voltage limit below which the battery charger causes the battery to provide power to the system to supplement the power provided by the power source,
      a second operational amplifier to amplify a difference between a second reference voltage value and output voltage of the battery to produce a second output, wherein the second reference voltage represents an upper voltage limit above which the battery charger prevents the battery from being charged by power from the power source,
      a third operational amplifier to amplify a difference between a third reference voltage value and a value representing input current from the power source to produce a third output, wherein the third reference voltage represents an upper current limit below which the battery charger holds the input current from the power source to prevent the input current from the power source from crashing the system, and
      a fourth operational amplifier to amplify a difference between a fourth reference voltage value and a value representing charger current output from the charger to produce a fourth output, wherein the fourth reference voltage represents an upper current limit above which the battery charger prevents the charging of the battery.

2. The power supply apparatus defined in claim 1 further comprising a second circuit coupled to the first, second, third and fourth operational amplifiers to combine the first, second, third and fourth outputs to produce a combined voltage.

3. The power supply apparatus defined in claim 2 wherein the second circuit comprises a compensator to integrate the first, second, third, and fourth outputs into the combined voltage.

4. The power supply apparatus defined in claim 1 wherein the battery charger is operable to control the charger duty cycle in response to any one of the first, second, third or fourth outputs indicating that corresponding inputs of the first, second, third and fourth operational amplifier exceed the first, second, third or fourth reference values, respectively.

5. The power supply apparatus defined in claim 1 further comprising a diode connected to each of the first, second, third and fourth outputs.

6. The power supply apparatus defined in claim 1 further comprising a diode connected to the first output.

7. A battery charger for coupling to a rechargeable battery, a system load, and a power source of undetermined output power that provides power to the system load, the battery charger comprising:
   a first circuit to generate an output that controls whether the battery is to provide power to the system to supplement the power provided by the power source when an input voltage from the power source of undetermined output power is less than a predetermined level, wherein the first circuit comprises a first operational amplifier to amplify a difference between a first reference voltage value and the input voltage from the power source to produce a first output, wherein the first reference voltage represents a lower voltage limit below which the battery charger causes the battery to provide power to the system to supplement the power provided by the power source;
   a second operational amplifier to amplify a difference between a second reference voltage value and output voltage of the battery to produce a second output, wherein the second reference voltage represents an upper voltage limit above which the battery charger prevents the battery from being charged by power from the power source;
   a third operational amplifier to amplify a difference between a third reference voltage value and a value representing input current from the power source to produce a third output, wherein the third reference voltage represents an upper current limit below which the battery charger holds the input current from the power source to prevent the input current from the power source from crashing the system; and
   a fourth operational amplifier to amplify a difference between a fourth reference voltage value and a value representing charger current output from the charger to produce a fourth output, wherein the fourth reference voltage represents an upper current limit above which the battery charger prevents the charging of the battery.

8. The battery charger defined in claim 7 further comprising a second circuit to combine the first, second, third and fourth outputs to produce a combined voltage from the first, second, third and fourth operational amplifiers.

9. The battery charger defined in claim 8 wherein the second circuit comprises a compensator to integrate the first, second, third, and fourth outputs into the combined voltage.

10. The battery charger defined in claim 7 wherein the battery charger is operable to control the charger duty cycle in response to any one of the first, second, third or fourth outputs indicating that corresponding inputs of the first, second, third and fourth operational amplifier exceed the first, second, third or fourth reference values, respectively.

11. The battery charger defined in claim 7 further comprising a diode connected to each of the first, second, third and fourth outputs.

12. The battery charger defined in claim 7 further comprising a diode connected to the first output.

13. A method for controlling a battery charger that is coupled to a rechargeable battery, a system load, and a power source of undetermined output power that provides power to the system load, the method comprising:
   receiving at least one reference voltage value from a reference source, the at least one reference voltage value representing a lower voltage limit below which the battery charger causes the battery to provide power to the system to supplement the power provided by the power source or the charger to lower the charging current of the battery until the power source voltage is returned to predetermined level; and generating a first output that controls whether the battery is to provide power to the system to supplement the power provided by the power source when the power source voltage from the power source of undetermined output power is less than the predetermined level, including generating the first output by amplifying, with an operational amplifier, a difference between a first reference voltage value and the input voltage from the power source;

generating a second output, using a second operational amplifier, by amplifying a difference between a second reference voltage value and output voltage of the battery, wherein the second reference voltage represents an upper voltage limit above which the battery charger prevents the battery from being charged by power from the power source;

generating a third output, using a third operational amplifier, by amplifying a difference between a third reference voltage value and a value representing input current from the power source, wherein the third reference voltage represents an upper current limit below which the battery charger holds the input current from the power source to prevent the input current from the power source from crashing the system; and generating a fourth output, using a fourth operational amplifier, by amplifying a difference between a fourth reference voltage value and a value representing charger current output from the charger to produce a fourth output, wherein the fourth reference voltage represents an upper current limit above which the battery charger prevents the charging of the battery.

14. The method defined in claim 13 further comprising combining the first, second, third and fourth outputs to produce a combined voltage from the first, second, third and fourth operational amplifiers.

15. The method defined in claim 14 wherein combining the first, second, third and fourth outputs to produce the combined voltage is performed, at least in part, by a compensator that integrates the first, second, third, and fourth outputs into the combined voltage.

16. The method defined in claim 13 wherein the battery charger is operable to throttle the charger duty cycle in response to any one of the first, second, third or fourth outputs indicating that corresponding inputs of the first, second, third and fourth operational amplifier exceed the first, second, third or fourth reference values, respectively.

\* \* \* \* \*